(12) United States Patent
Yoshikawa

(10) Patent No.: US 12,285,947 B2
(45) Date of Patent: Apr. 29, 2025

(54) PRINTING APPARATUS AND PRINTING METHOD

(71) Applicant: SEIKO EPSON CORPORATION, Tokyo (JP)

(72) Inventor: Eishin Yoshikawa, Nagano (JP)

(73) Assignee: Seiko Epson Corporation, Tokyo (JP)

(*) Notice: Subject to any disclaimer, the term of this patent is extended or adjusted under 35 U.S.C. 154(b) by 189 days.

(21) Appl. No.: 18/145,067

(22) Filed: Dec. 22, 2022

(65) Prior Publication Data

US 2023/0202176 A1 Jun. 29, 2023

(30) Foreign Application Priority Data

Dec. 24, 2021 (JP) ................................. 2021-210362

(51) Int. Cl.
*B41J 2/14* (2006.01)
*B41J 2/21* (2006.01)
*G06V 10/12* (2022.01)

(52) U.S. Cl.
CPC ........... *B41J 2/1433* (2013.01); *B41J 2/2103* (2013.01); *B41J 2/2142* (2013.01); *G06V 10/12* (2022.01)

(58) Field of Classification Search
CPC ...... B41J 2/2132; B41J 2/2135; B41J 2/2128; B41J 2/2142; B41J 2/2103; B41J 2/1433; B41J 29/38; B41J 2029/3935
See application file for complete search history.

(56) References Cited

U.S. PATENT DOCUMENTS

2014/0292863 A1* 10/2014 Tanase ................... B41J 2/2146
 347/13
2019/0248152 A1* 8/2019 Doi ......................... B41J 2/155

FOREIGN PATENT DOCUMENTS

JP 2016-185671 A 10/2016

* cited by examiner

*Primary Examiner* — Jannelle M Lebron
(74) *Attorney, Agent, or Firm* — Global IP Counselors, LLP

(57) ABSTRACT

A printing apparatus includes a printing head provided with a first nozzle row and a second nozzle row arranged shifted from the first nozzle row in a nozzle alignment direction, and a control unit configured to control ejection of ink from nozzles included in the printing head onto a medium based on print data. The control unit is configured to set an image to be complemented as a partial region of an image to be printed on the medium in accordance with a boundary portion between the first nozzle row and the second nozzle row, assign print data for printing the image to be completed to at least one of a first adjacent nozzle that is a nozzle in the first nozzle row and adjacent to the boundary portion and a second adjacent nozzle that is a nozzle in the second nozzle row and adjacent to the boundary portion, and complement the image to be complemented by ink ejection from at least one of the first adjacent nozzle and the second adjacent nozzle.

6 Claims, 9 Drawing Sheets

PRINTING APPARATUS AND PRINTING METHOD

The present application is based on, and claims priority from JP Application Serial Number 2021-210362, filed Dec. 24, 2021, the disclosure of which is hereby incorporated by reference herein in its entirety.

BACKGROUND

1. Technical Field

The present disclosure relates to a printing apparatus and a printing method.

2. Related Art

A configuration is known in which, in a head of an inkjet printer, a plurality of nozzle rows are partially overlapped to perform printing. Further, a single-pass printing head provided with a plurality of head modules alternately shifted in a paper feeding direction and disposed side by side in a vertical paper feeding direction has been disclosed (refer to JP-A-2016-185671). In this single-pass printing head, a joint portion between the head modules is disposed with both head modules overlapping, and the nozzles of both head modules are disposed substantially alternately in the vertical paper feeding direction.

In a configuration in which printing is performed with nozzle rows or the head modules, as in JP-A-2016-185671, partially overlapping each other, a position shift of the nozzles of the overlapping portion in the nozzle alignment direction causes density irregularities in the printing result. Therefore, it is necessary to couple components to each other with high accuracy to ensure that a position shift does not occur. However, the task of precisely coupling the components in each individual product requires time and effort, which causes an increase in cost.

Further, even if the components are precisely coupled, the timing at which ink dots land on the medium or the number of nozzles used for printing one raster line differs between the overlapping portion and a non-overlapping portion where the nozzle rows do not overlap, making the printing result susceptible to density differences. In order to suppress such density differences, image processing such as correcting the density in print data corresponding to the overlapping portion is sometimes performed.

Nevertheless, as long as an overlapping portion and a non-overlapping portion coexist, it is not easy to eliminate density differences in the printing result caused by these fundamental differences. Therefore, improvements for eliminating image quality degradation caused by the overlapping portion are in demand.

SUMMARY

A printing apparatus includes a printing head including a first nozzle row, in which a plurality of nozzles are provided side by side in a nozzle alignment direction and a second nozzle row arranged shifted from the first nozzle row in the nozzle alignment direction and in which a plurality of nozzles are provided side by side in the nozzle alignment direction, and a control unit configured to control ejection of ink from the plurality of nozzles included in the printing head onto a medium based on print data. The control unit is configured to set an image to be complemented as a partial region of an image to be printed on the medium in accordance with a boundary portion between the first nozzle row and the second nozzle row, assign print data for printing the image to be complemented to at least one of a first adjacent nozzle that is a nozzle in the first nozzle row and adjacent to the boundary portion and a second adjacent nozzle that is a nozzle in the second nozzle row and adjacent to the boundary portion, and complement the image to be complemented by ink ejection from at least one of the first adjacent nozzle and the second adjacent nozzle based on the print data assigned.

A printing apparatus includes a printing head including a nozzle row, in which a plurality of nozzles are provided side by side in a nozzle alignment direction, and configured to move in a main scanning direction intersecting the nozzle alignment direction, and a control unit configured to execute a pass of ejecting ink from a nozzle onto a medium based on print data in association with the movement. The control unit is configured to set an image to be complemented as a partial region of an image to be printed on the medium in accordance with a boundary portion between a position of the nozzle row during execution of a first pass on the medium and a position of the nozzle row during execution of a second pass following the first pass, assign print data for printing the image to be complemented to at least one of a first adjacent nozzle that is a nozzle of the nozzle row during execution of the first pass and adjacent to the boundary portion and a second adjacent nozzle that is a nozzle of the nozzle row during execution of the second pass and adjacent to the boundary portion, and complement the image to be complemented by ink ejection from at least one of the first adjacent nozzle and the second adjacent nozzle based on the print data assigned.

A printing method of controlling, based on print data, a printing head to eject ink from a nozzle onto a medium, the printing method including a first nozzle row, in which a plurality of nozzles are provided side by side in a nozzle alignment direction, and a second nozzle row arranged shifted from the first nozzle row in the nozzle alignment direction and in which a plurality of nozzles are provided side by side in the nozzle alignment direction. The printing method includes a setting step for setting an image to be complemented as a partial region of an image to be printed on the medium in accordance with a boundary portion between the first nozzle row and the second nozzle row, an assigning step for assigning print data for printing the image to be complemented to at least one of a first adjacent nozzle that is a nozzle in the first nozzle row and adjacent to the boundary portion and a second adjacent nozzle that is a nozzle in the second nozzle row and adjacent to the boundary portion, and a complementing step for complementing the image to be complemented by ink ejection from at least one of the first adjacent nozzle and the second adjacent nozzle based on the print data assigned.

A printing method of performing printing by executing a pass of ejecting ink from a nozzle onto a medium based on print data while moving a printing head including a nozzle row, in which a plurality of nozzles are provided side by side in a nozzle alignment direction, in a main scanning direction intersecting the nozzle alignment direction. The printing method includes a setting step for setting an image to be complemented as a partial region of an image to be printed on the medium in accordance with a boundary portion between a position of the nozzle row during execution of a first pass on the medium and a position of the nozzle row during execution of a second pass following the first pass, an assigning step for assigning print data for printing the image to be complemented to at least one of a first adjacent nozzle that is a nozzle of the nozzle row during execution of the first pass and adjacent to the boundary portion and a second adjacent nozzle that is a nozzle of the nozzle row during execution of the second pass and adjacent to the boundary portion, and a complementing step for complementing the image to be complemented by ink ejection from at least one of the first adjacent nozzle and the second adjacent nozzle based on the print data assigned.

DESCRIPTION OF EXEMPLARY EMBODIMENTS

Exemplary embodiments of the present disclosure will be described below with reference to the accompanying drawings. Note that each of the drawings is merely illustrative for describing the embodiment. Since the drawings are illustrative, proportions and shapes may not be precise or may not match each other, or some may be omitted.

1. Overview of Apparatus Configuration

Figure 1:
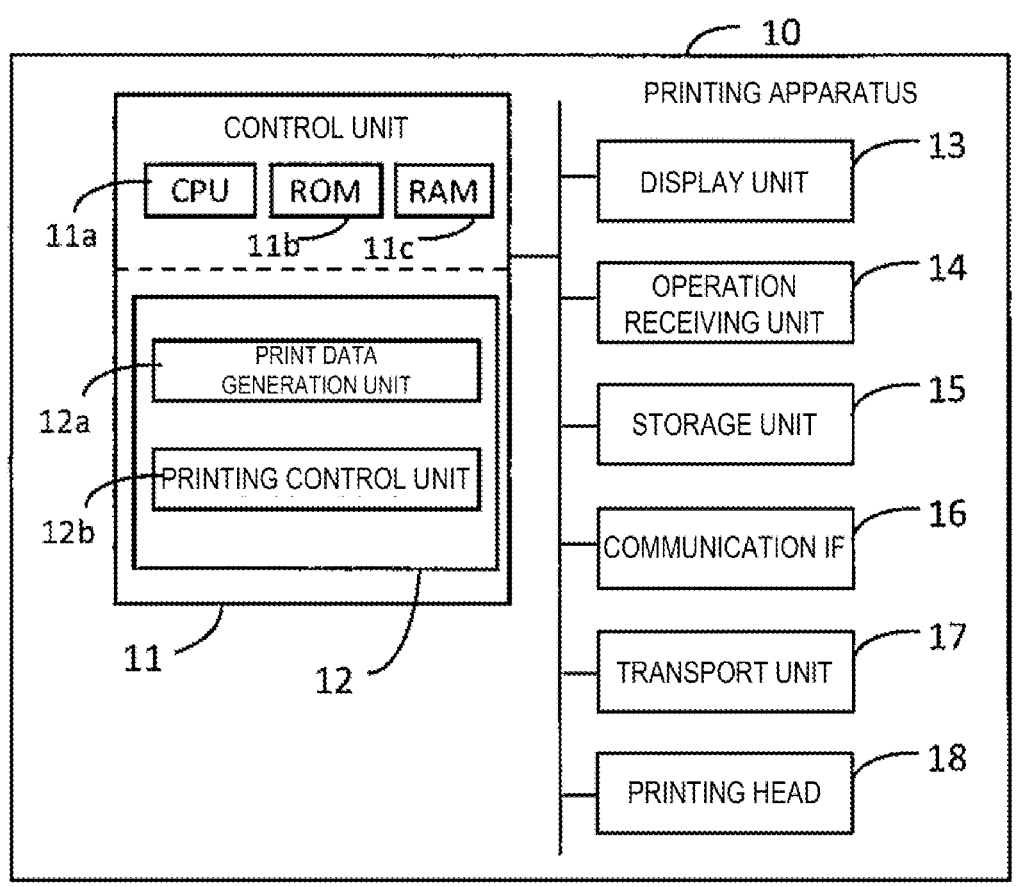
FIG. 1 is a block diagram illustrating, in a simplified manner, an apparatus configuration of an exemplary embodiment.

FIG. 1 illustrates, in a simplified manner, a configuration of a printing apparatus 10 according to this exemplary embodiment. A printing method according to this exemplary embodiment is executed by the printing apparatus 10.

The printing apparatus 10 includes a control unit 11, a display unit 13, an operation receiving unit 14, a storage unit 15, a communication IF 16, a transport unit 17, a printing head 18, and the like. IF is an abbreviation for interface. The control unit 11 is configured to include one or a plurality of integrated circuits (ICs) including a central processing unit (CPU) 11a as a processor, a read-only memory (ROM) 11b, a random access memory (RAM) 11c, and the like, and other non-volatile memory, and the like.

In the control unit 11, the processor, that is, the CPU 11a, executes arithmetic processing in accordance with a program 12 stored in the ROM 11b, other memory, or the like, using the RAM 11c or the like as a work area, realizing various functions such as a print data generation unit 12a and a printing control unit 12b. The processor is not limited to a single CPU, and a configuration may be adopted in which the processing is performed by a plurality of CPUs or a hardware circuit such as an application-specific integrated circuit (ASIC) or the like, or a configuration may be adopted in which the CPU and the hardware circuit work in concert to perform the processing.

The display unit 13 is a unit for displaying visual information, and is configured by, for example, a liquid crystal display, an organic electroluminescent (EL) display, or the like. The display unit 13 may be configured to include a display and a driving circuit for driving the display. The operation receiving unit 14 is a unit for receiving an input by a user, and is realized by, for example, a physical button, a touch panel, a mouse, a keyboard, or the like. Of course, the touch panel may be realized as a function of the display unit 13. The display unit 13 and the operation receiving unit 14 may be collectively referred to as an operating panel of the printing apparatus 10. The display unit 13 and the operation receiving unit 14 may be part of the configuration of the printing apparatus 10, or may be peripheral devices externally coupled to the printing apparatus 10.

The storage unit 15 is, for example, a hard disk drive, a solid state drive, or a storage device of other memory. A portion of the memory included in the control unit 11 may be regarded as the storage unit 15. A portion of the control unit 11 may be regarded as the storage unit 15.

The communication IF 16 is a generic term for one or a plurality of IFs for executing communication by the printing apparatus 10 with an external device in a wired or wireless manner, in accordance with a predetermined communication protocol including a known communication standard. The external device is, for example, a communication device such as a personal computer, a server, a smartphone, or a tablet type terminal.

The transport unit 17 is a unit for transporting a medium 30 in a predetermined transport direction under the control of the control unit 11. The transport unit 17 includes, for example, a roller that rotates and transports the medium 30 and a motor as a power source of rotation. Further, the transport unit 17 may be a mechanism that transports the medium 30 with the medium 30 being mounted on a belt or a pallet moved by a motor. The medium 30 may be, for example, a sheet, but may be a material other than a sheet, such as film or fabric, as long as the medium is one on which printing can be performed.

The printing head 18 is a device for ejecting liquid such as ink from a plurality of nozzles by an inkjet method under the control of the control unit 11, and performing printing on the medium 30 transported by the transport unit 17. A droplet ejected from a nozzle of the printing head 18 is referred to as a dot. The printing head 18 is capable of ejecting a plurality of colors of ink, such as cyan (C), magenta (M), yellow (Y), and black (K), for example. Of course, the printing head 18 is not limited to the CMYK ink, and various colors of ink and liquid can be ejected. The printing head 18 may be referred to as a liquid-ejecting head, a recording head, a printing head, an inkjet head, or the like.

The printing apparatus 10 may be realized by a single printer, or may be realized by a system including a plurality of communicatively coupled devices. For example, the printing apparatus 10 may be a system including an information processing device responsible for the functions of the control unit 11, and a printer that includes the transport unit 17 and the printing head 18 and executes printing under control by the information processing device. In this case, the information processing device can be regarded as a printing control device, an image processing device, or the like.

2. Configuration of Printing Head

Figure 2:
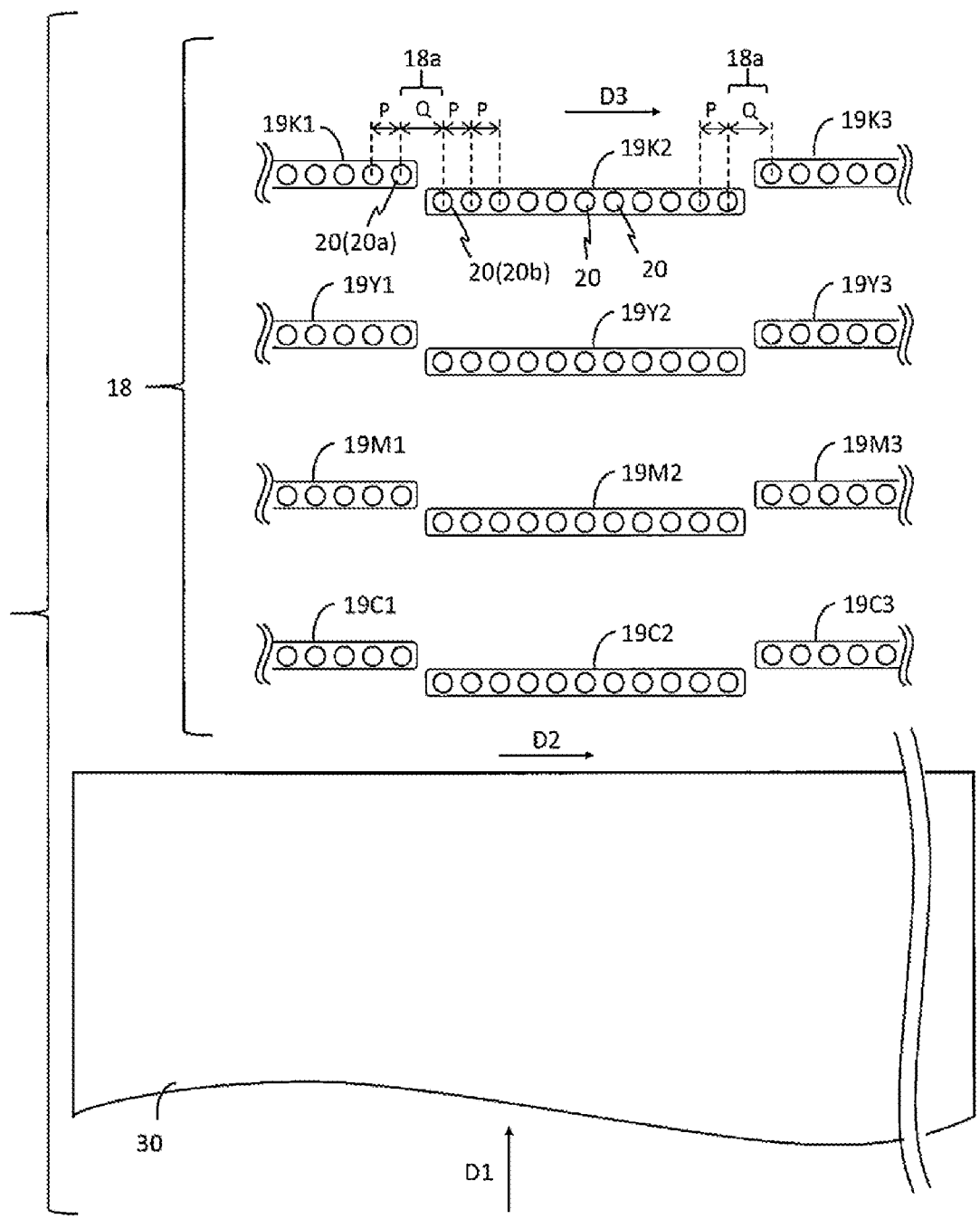
FIG. 2 is a view illustrating, in a simplified manner, a relationship between a medium and a printing head of a first example, as viewed from above.

FIG. 2 illustrates, in a simplified manner, a relationship between the medium 30 and the printing head 18, as viewed from above. The printing head 18 illustrated in FIG. 2 is referred to as the printing head 18 of a "first example".

The arrow denoted as D1 indicates a transport direction D1 of the medium 30 by the transport unit 17. The transport unit 17 transports the medium 30 from upstream to downstream in the transport direction D1. Upstream and downstream in the transport direction D1 are simply referred to as upstream and downstream. The arrow denoted as D2 is orthogonal to the transport direction D1, and indicates a width direction D2. A length of the medium 30 in the width direction D2 is referred to as a medium width.

FIG. 2 illustrates a portion of the printing head 18. In FIG. 2, each white circle is an individual nozzle 20. The arrow denoted as D3 indicates a nozzle alignment direction D3. In the example in FIG. 2, the nozzle alignment direction D3 is parallel with the transport direction D2 and orthogonal to the transport direction D1. That is, the direction D3 is the same as the direction D2. However, as a configuration of the printing head 18, the nozzle alignment direction D3 may obliquely intersect the width direction D2.

The printing head 18 includes a nozzle row for each ink color. The nozzle row is configured by a plurality of the nozzles 20 arranged side by side at predetermined intervals in the nozzle alignment direction D3. This interval is expressed as a "nozzle pitch P". The nozzle pitch P may be interpreted as a distance between centers of the nozzle 20 and the nozzle 20 adjacent in a nozzle row. The printing head 18 includes a plurality of the nozzle rows, such as nozzle rows 19K1, 19K2, 19K3 . . . for the K ink, for example. The nozzle rows 19K1, 19K2, 19K3 are each constituted by a plurality of the nozzles 20 for ejecting the K ink.

A configuration in which the plurality of nozzle rows are continuously shifted in the nozzle alignment direction D3 for a single color ink is referred to as a nozzle row unit here. That is, in the example in FIG. 2, the nozzle rows 19K1, 19K2, 19K3 . . . constitute a nozzle row unit of the K ink. Similarly, nozzle rows 19C1, 19C2, 19C3 . . . of the plurality of the nozzles 20 for ejecting the C ink constitute a nozzle row unit of the C ink, nozzle rows 19M1, 19M2, 19M3 . . . of the plurality of the nozzles 20 for ejecting the M ink constitute a nozzle row unit of the M ink, and nozzle rows 19Y1, 19Y2, 19Y3 . . . of the plurality of the nozzles 20 for ejecting the Y ink constitute a nozzle row unit of the Y ink.

Accordingly, the printing head 18 includes a nozzle row unit for each CMYK ink. As illustrated in FIG. 2, the respective nozzle row units of CMYK are aligned in the transport direction D1, and positions thereof coincide or substantially coincide in the width direction D2. Although description is omitted in FIG. 2, the respective nozzle row units of CMYK have a length configured to cover the medium width in the width direction D2. According to such an example, when the medium 30 transported at a predetermined velocity by the transport unit 17 passes under the printing head 18 arranged on a transport path, printing is performed on the medium 30 by ejection of the ink being received in the order of C, M, Y, K from the printing head 18.

When focus is placed on one nozzle row unit, one of two nozzle rows adjacent to each other in the nozzle alignment direction D3 is referred to as a "first nozzle row" and the other nozzle row is referred to as a "second nozzle row". The first nozzle row and the second nozzle row do not refer to specific nozzle rows, but are merely expressions for distinguishing two adjacent nozzle rows. For example, in the nozzle row unit of the K ink, when the nozzle row 19K1 is regarded as the first nozzle row, the nozzle row 19K2 corresponds to the second nozzle row. Or, when the nozzle row 19K2 is regarded as the first nozzle row, the nozzle row 19K1 or the nozzle row 19K3 corresponds to the second nozzle row. In the respective nozzle row units of CMY as well, the same concept is adopted for the first nozzle row and the second nozzle row.

According to FIG. 2, in the printing head 18 of the first example, the first nozzle row and the second nozzle row do not overlap in the nozzle alignment direction D3. A "boundary portion" is provided between the first nozzle row and the second nozzle row. The boundary portion can be regarded as a range without the nozzles 20 that can be used for printing. Specifically, a "first adjacent nozzle" serving as the nozzle 20 at an end of the first nozzle row on the second nozzle row side, and a "second adjacent nozzle" serving as the nozzle 20 at an end of the second nozzle row on the first second nozzle row side are spaced apart by a distance longer than the nozzle pitch P, and thus a boundary portion 18a is disposed between the first adjacent nozzle and the second adjacent nozzle. "Adjacent nozzle" is a term used to refer to a nozzle adjacent to the boundary portion.

For example, when the nozzle row 19K1 is defined as a first nozzle row and the nozzle row 19K2 is defined a second nozzle row, the nozzle 20 at the end of the nozzle row 19K1 on the nozzle row 19K2 side corresponds to a first adjacent nozzle 20a, and the nozzle 20 at the end of the nozzle row 19K2 on the nozzle row 19K1 side corresponds to a second adjacent nozzle 20b. According to FIG. 2, the interval between the first adjacent nozzle 20a and the second adjacent nozzle 20b in the nozzle alignment direction D3 is a distance Q, and is P<Q. Further, according to FIG. 2, the position of the boundary portion 18a is common to each nozzle row unit of CMYK.

In consideration of complementation described below, the distance Q is more preferably from 1.5 times to 2.0 times the nozzle pitch P. According to such a numerical value, the boundary portion 18a can be regarded as a gap equivalent to from about 0.5 to 1.0 nozzles between the first adjacent nozzle and the second adjacent nozzle. Accordingly, in the present exemplary embodiment, when the nozzle rows are coupled to each other to manufacture a nozzle row unit, the coupling need only be performed so that a distance between the first adjacent nozzle of the first nozzle row and the second adjacent nozzle of the second nozzle row is from 1.5 times to 2.0 times the nozzle pitch P. Therefore, there is no need to strictly match the positional relationship of the nozzles in the nozzle rows as in the related art, and thus the manufacturing process is simplified.

The control unit 11 causes the printing head 18 to eject ink onto the medium 30 on the basis of print data representing an image. As is known, in the printing head 18, a driving element is provided for each of the nozzles 20 and application of a drive signal to the driving element of each nozzle 20 is controlled in accordance with the print data, and thus each of the nozzles 20 ejects a dot or does not eject a dot, thereby printing the image represented by the print data on the medium 30. The print data is data that defines, for each pixel, a presence or an absence of the dot of each color ink and a size of the dot. In the following, the presence of a dot, that is, ejection of a dot, is also referred to as "dot-on" and the absence of a dot, that is, non-ejection of a dot, is also referred to as "dot-off".

By varying an amplitude, a shape, and the like of the drive signal applied to the driving element of the nozzle 20, it is possible to vary the size of the dot ejected by the nozzle 20. For example, the nozzle 20 can eject dots of three sizes, namely a large dot, a medium dot, and a small dot. The relationship between the dot sizes is small dot<medium dot<large dot. Accordingly, the dot-on data per pixel defined by the print data is classified as one of large dot-on, medium dot-on, and small dot-on. Note that the sizes of the dots that can be ejected by the nozzle 20 may be two types, or may be four or more types.

Figure 3:
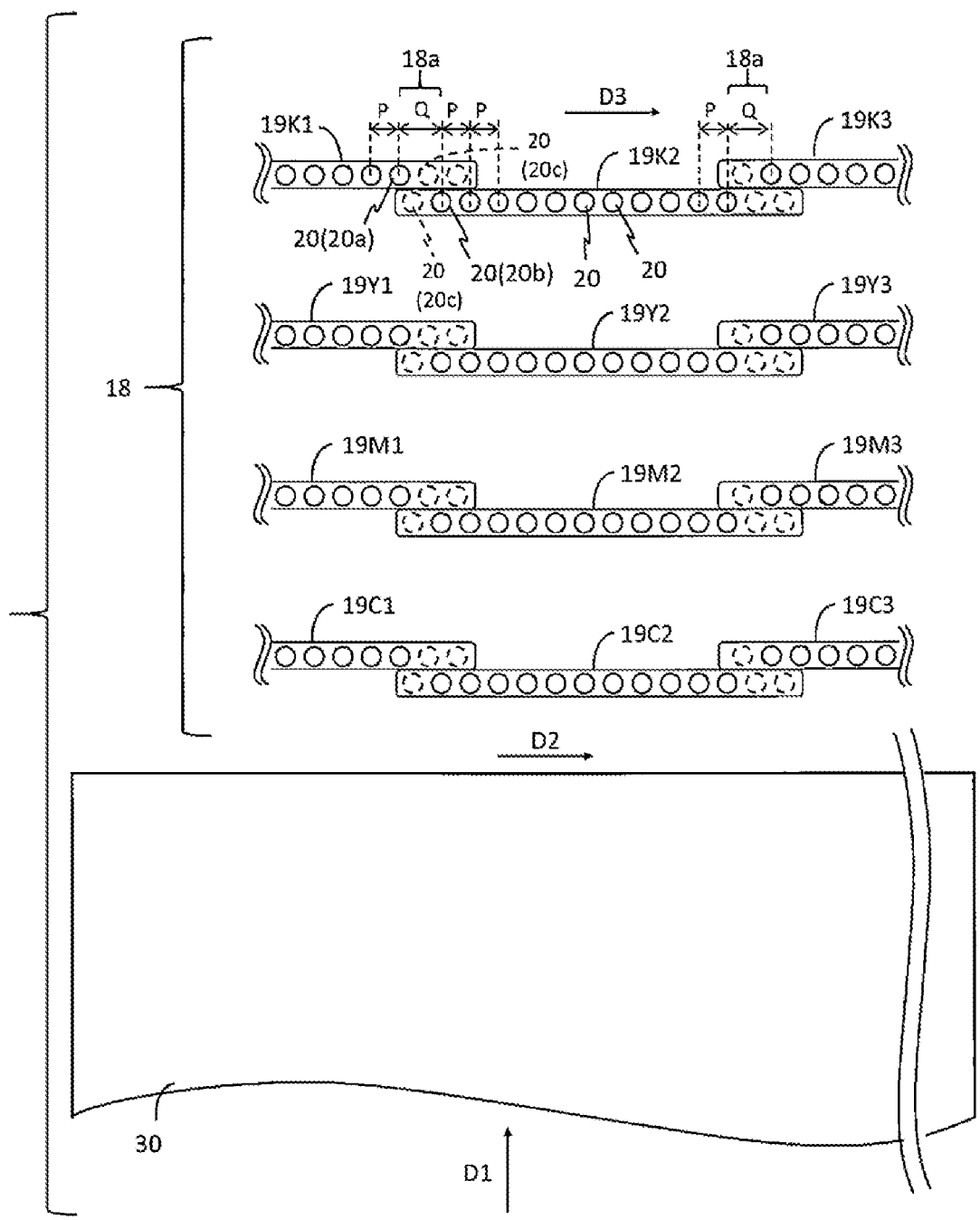
FIG. 3 is a view illustrating, in a simplified manner, a relationship between the medium and the printing head of a second example, as viewed from above.

FIG. 3 illustrates, in a simplified manner, a relationship between the medium 30 and the printing head 18, as viewed from above. The printing head 18 illustrated in FIG. 3 is referred to as the printing head 18 of a "second example". The way of viewing FIG. 3 is the same as that of FIG. 2, and the printing head 18 of the second example will now be described in terms of the differences from the printing head 18 of the first example.

According to FIG. 3, in the printing head 18 of the second example, an end portion of the first nozzle row on the second nozzle row side and an end portion of the second nozzle row on the first nozzle row side overlap in the nozzle alignment direction D3. Specifically, the nozzle 20 of the first nozzle row and the nozzle 20 of the second nozzle row disposed between the first adjacent nozzle and the second adjacent nozzle are "unused nozzles" not used for ink ejection, and thus the boundary portion 18a is disposed between the first adjacent nozzle and the second adjacent nozzle. In the second example, at least one of the first adjacent nozzle and the second adjacent nozzle does not correspond to the nozzle 20 at the end of the corresponding nozzle row.

The unused nozzle is present as the nozzle 20, but is not used for printing. The unused nozzle is not assigned print data in steps S120, S130 of FIG. 4 described below. That is, the difference between the second example and the first example is whether an unused nozzle exists in the boundary portion 18a. In FIG. 3, the nozzles 20 corresponding to the unused nozzles are indicated by dashed circles. Basically, of the nozzles 20 of the first nozzle row, the nozzles 20 on the second nozzle row side of the first adjacent nozzle are unused nozzles and, of the nozzles 20 in the second nozzle row, the nozzles 20 on the first nozzle row side of the second adjacent nozzle are the unused nozzles.

Here as well, as an example, the nozzle row 19K1 is defined as a first nozzle row, and the nozzle row 19K2 is defined as a second nozzle row. The interval between the first adjacent nozzle 20a, which is one nozzle 20 of the nozzle row 19K1, and the second adjacent nozzle 20b, which is one nozzle 20 of the nozzle row 19K2, is the distance Q, and each of the nozzles 20 of the nozzle row 19K1 and the nozzles 20 of the nozzle row 19K2 within this distance Q corresponds to an unused nozzle 20c at the boundary portion 18a. When the printing head 18 of the second example is assumed, the term nozzles or nozzles 20 in the following refers to nozzles excluding the unused nozzles, unless otherwise indicated. Of course, the nozzles excluding the unused nozzles include the first adjacent nozzle and the second adjacent nozzle.

In this exemplary embodiment, both the first example and the second example may be adopted as the configuration of the printing head 18. Hereinafter, description will be made without particular distinction between the first example and the second example.

3. Printing Control Processing

Figure 4:
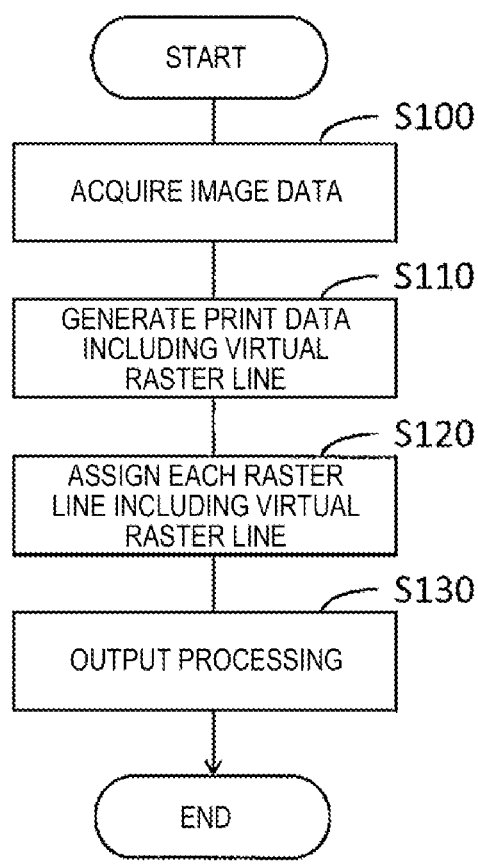
FIG. 4 is a flowchart illustrating printing control processing.

FIG. 4 illustrates, using a flowchart, printing control processing executed by the control unit 11 in accordance with the program 12. The flowchart indicates a printing method according to this exemplary embodiment.

In step S100, the print data generation unit 12a of the control unit 11 acquires image data representing the image to be printed. The print data generation unit 12a acquires, for example, image data specified through operation of the operation receiving unit 14 by the user from a storage location of the image data, such as the storage unit 15 or memory inside or outside the printing apparatus 10. Alternatively, the print data generation unit 12a receives and acquires the image data transmitted from an external device via the communication IF 16.

In step S110, the print data generation unit 12a generates print data on the basis of the image data acquired in step S100. The print data generated in step S110 is print data including a "virtual raster line".

First, basic steps for generating the print data on the basis of the image data will be described. The print data generation unit 12a performs resolution conversion processing for adjusting the number of vertical and horizontal pixels of the image data to the number of pixels required in accordance with the size of the medium 30 preset and the vertical and horizontal printing resolution expressed by the printing head 18 and the transport unit 17. Here, vertical refers to the transport direction D1 and horizontal refers to the width direction D2.

Next, the print data generation unit 12a converts the value for each pixel constituting the image data to a gradation value representing the ink amount of each color of ink used for printing by the printing head 18. While the color system adopted by the image data is not particularly limited, if the image data is RGB image data having a gradation value of red (R), green (G), and blue (B) for each pixel, for example, the print data generation unit 12a converts the respective gradation values of RGB for each pixel of the image data to each gradation value of CMYK with reference to a look-up table defining a conversion relationship between RGB and CMYK. The gradation value is represented by, for example, 256 gradations from 0 to 255.

Next, the print data generation unit 12a converts each gradation value of CMYK that the image data after color conversion has for each pixel into a value representing dot-on or dot-off for each CMYK ink by halftone processing. The dot-on is, of course, a large dot-on, a medium dot-on, or a small dot-on. In this manner, the data acquired through the predetermined resolution conversion processing, color conversion processing, and halftone processing from the image data acquired in step S100 is the print data.

In the print data, a direction intersecting the nozzle alignment direction D3, that is, a pixel row that is a row of pixels side by side in the transport direction D1 herein, is referred to as "raster line". Further, the result of such a pixel row being printed on the medium 30 may be referred to as a raster line as well. In the configuration in which the printing head 18 of the first example or the second example is used, the ink of one color of one raster line constituting the print data is printed by dot ejection by one nozzle 20 corresponding to the ink. In this exemplary embodiment, it is assumed that there is one "virtual nozzle" at one boundary portion 18a for each nozzle row unit of CMYK. The virtual nozzle is virtual and thus not present. The print data generation unit 12a generates a raster line, that is, a virtual raster line, corresponding to the virtual nozzle. When the term nozzles or nozzles 20 is used, the term does not include virtual nozzles.

Figure 5:
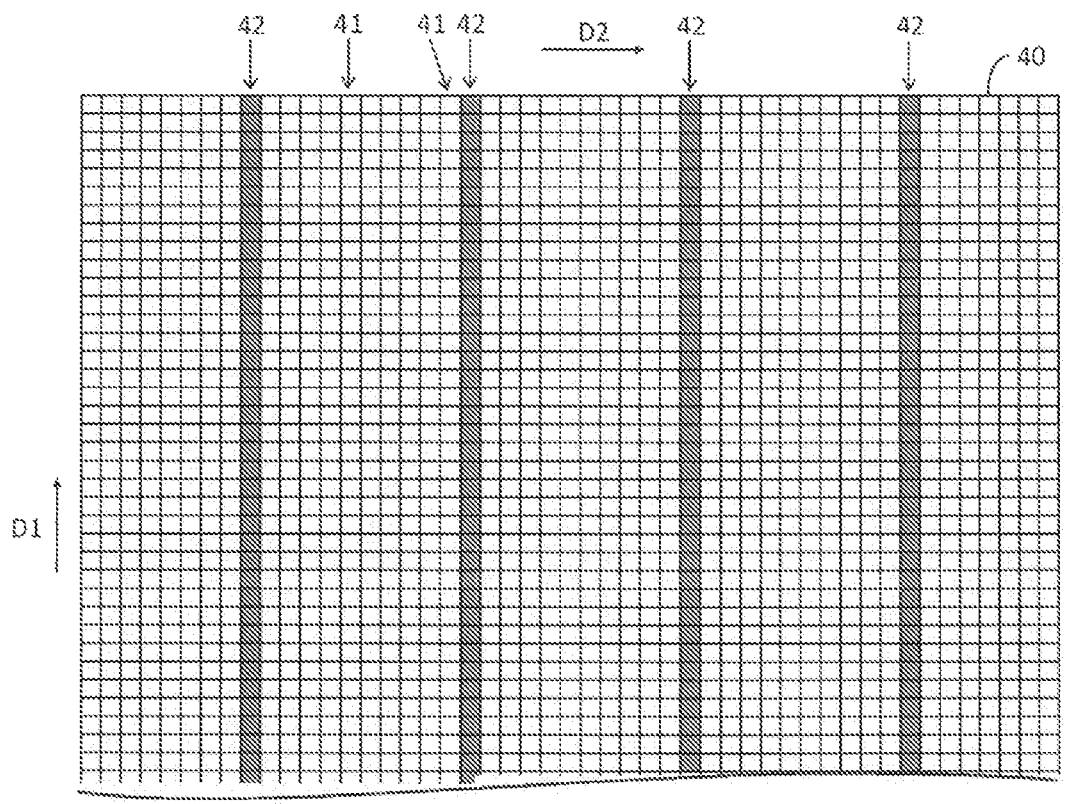
FIG. 5 is a view exemplifying print data including a virtual raster line.

FIG. 5 exemplifies a portion of print data 40 corresponding to ink of one color, such as the K ink, for example. In FIG. 5, a correspondence relationship between an orientation of the print data 40 and the directions D1, D2 is also illustrated. In FIG. 5, the individual rectangles are each a pixel constituting the print data 40. Each pixel has a value indicating one of large dot-on, medium dot-on, small dot-on, or dot-off for the K ink. A raster line 42 composed of pixels of a gray color is the virtual raster line 42, and a raster line composed of white pixels such as, for example, a raster line 41 is the normal raster line 41. "Normal raster line" is a term for distinguishing the line from a virtual raster line, and normal raster lines are assigned one-to-one to each nozzle 20 including the first adjacent nozzle and the second adjacent nozzle in accordance with the position in the width direction D2. The gray color or the white color of the pixels in FIG. 5 is merely a representation for easily distinguishing between the virtual raster line 42 and the normal raster line, and is unrelated to the actual image color.

Information regarding the configuration of the printing head 18 including the boundary portion 18a is stored in advance in the storage unit 15, and the print data generation unit 12a can refer to this information as appropriate. Thus, in step S110, the print data generation unit 12a assumes virtual nozzles of the boundary portion 18a in addition to each actual nozzle 20 in the process of generating print data on the basis of the image data, and generates, for each color of ink, the print data 40 including the normal raster lines corresponding to the nozzles 20 and the virtual raster lines 42 corresponding to the virtual nozzles, such as illustrated in FIG. 5. The virtual raster line 42 in the printing data 40 is a specific example of an "image to be complemented" or "print data for printing an image to be complemented". Accordingly, step S110 can be said to include a "setting step" for setting an image to be complemented in accordance with the boundary portion 18a between the first nozzle row and the second nozzle row, as a partial region of the image to be printed on the medium 30.

In step S120, the printing control unit 12b assigns each raster line including the virtual raster lines constituting the print data generated in step S110 to each nozzle 20 in the nozzle row units for each CMYK of the printing head 18 in accordance with positions and ink colors thereof. The printing control unit 12b assigns each of the normal raster lines to the nozzles 20. On the other hand, because the virtual nozzles do not actually exist, the printing control unit 12b assigns each virtual raster line to the first adjacent nozzle or the second adjacent nozzle adjacent to the virtual nozzle. Step S120 corresponds to the "assigning step".

In step S130, the printing control unit 12b executes output processing of the print data. That is, the printing control unit 12b controls the transport unit 17 to start transport of the medium 30 and, in accordance with the assignments in step S120, transfers the data of each raster line constituting the print data to the nozzle 20 to which the data is assigned. As a result, a dot is ejected from each nozzle 20 of each nozzle row unit of the printing head 18 onto the medium 30 according to the value of each pixel of the assigned raster line, and the image represented by the print data is printed on the medium 30. At this time, the virtual raster line is printed on the medium 30 by the dots being ejected by the first adjacent nozzle or the second adjacent nozzle that is the nozzle 20 to which the data is assigned. That is, as a portion of the image to be printed, the image to be complemented is complemented by the first adjacent nozzle or the second adjacent nozzle. Although step S120 and step S130 are described separately in FIG. 4, step S120 and step S130 may be interpreted as substantially one process or as processes executed in parallel. Further, the responsibilities of the print data generation unit 12a and the printing control unit 12b do not need to be limited to the forms described above.

Figure 6:
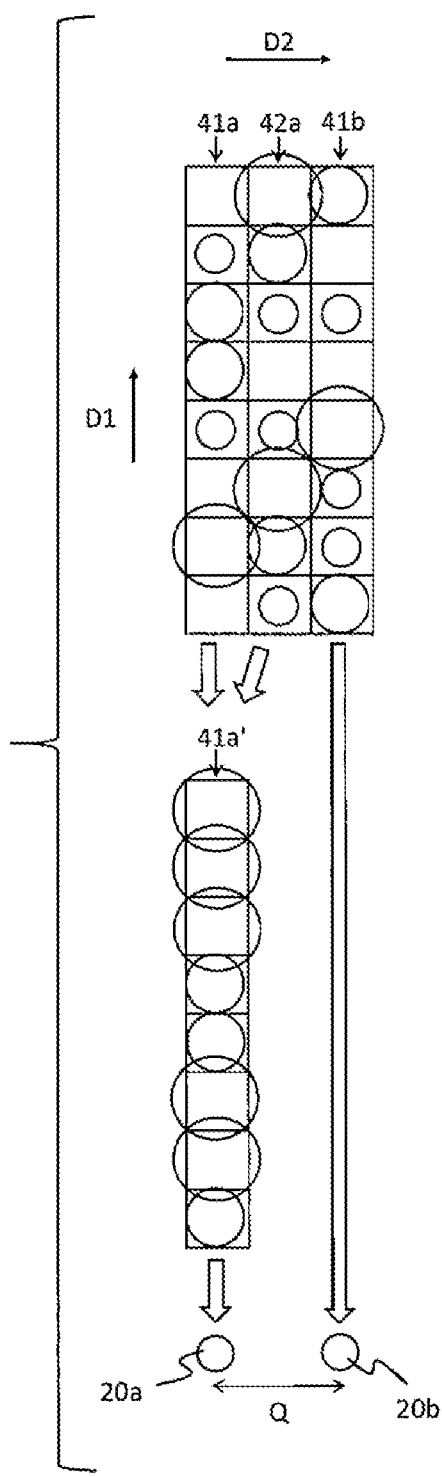
FIG. 6 is a view for explaining a specific example of a complementing step.

Such steps S120, S130 include a "complementing step". A specific example of the complementing step will be described with reference to FIG. 6. FIG. 6 illustrates a portion of one virtual raster line 42a and portions of normal raster lines 41a, 41b, each adjacent to the virtual raster line 42a. These raster lines 41a, 41b, 42a are data generated as a portion of the print data in step S110. In FIG. 6, large dot-on, medium dot-on, small dot-on, and dot-off are each represented by the presence or absence and the size of the circle in each pixel constituting the raster lines 41a, 41b, 42a, and a raster line 41a'.

Here, the normal raster line 41a is a raster line assigned to the first adjacent nozzle 20a of the nozzle row 19K1, and the normal raster line 41b is a raster line assigned to the second adjacent nozzle 20b of the nozzle row 19K2. Further, the virtual raster line 42a is a raster line generated in accordance with a presumed virtual nozzle in the boundary portion 18a between the first adjacent nozzle 20a and the second adjacent nozzle 20b. The printing control unit 12b assigns the virtual raster line 42a to the first adjacent nozzle 20a, for example.

There exists the normal raster line 41a actually assigned to the first adjacent nozzle 20a. Accordingly, in step S120, the printing control unit 12b assigns, to the first adjacent nozzle 20a, the raster line 41a' obtained by adding the virtual raster line 42a to the normal raster line 41a. Although there are various methods of adding the virtual raster line 42a to the normal raster line 41a to obtain the raster line 41a', basically the printing control unit 12b need only generate the raster line 41a' by adding the values of the pixels aligned in position in the transport direction D1.

For example, if large dot-on, medium dot-on, or small dot-on is added to a dot-off, the dot becomes the large dot-on, the medium dot-on, or the small dot-on in the raster line 41a'. Further, for example, adding small dot-on to small dot-on results in medium dot-on. Further, for example, adding medium dot-on to small dot-on results in large dot-on. It should be noted that dots larger than the large dot cannot be formed in one pixel for one color. Accordingly, medium dot-on+medium dot-on, medium dot-on+large dot-on, and large dot-on+large dot-on each result in large dot-on. However, for a pixel in the raster line 41a', when medium dot-on+large dot-on or large dot-on+large dot-on is presumed to result in large dot-on, the printing control unit 12b may diffuse the remaining ink amount into other pixels in the raster line 41a' to increase the size of the dots of the other pixels.

According to the example in FIG. 6, in step S130, the printing control unit 12b transfers the data of the raster line 41a' to the first adjacent nozzle 20a, and transfers the data of the normal raster line 41b to the second adjacent nozzle 20b. As a result, dots are ejected from the first adjacent nozzle 20a onto the medium 30 according to the value of each pixel of the raster line 41a', and dots are ejected from the second adjacent nozzle 20 onto the medium 30 according to the value of each pixel of the normal raster line 41b. That is, compared to a case of ejection in accordance with the value of each pixel of the normal raster line 41a, additional ink in an amount equivalent to the added portion of the virtual raster line 42a is ejected from the first adjacent nozzle 20a. Therefore, the dots ejected from the first adjacent nozzle 20a onto the medium 30 are spread out to a region of the medium 30 corresponding to the distance Q serving as the interval between the first adjacent nozzle 20a and the second adjacent nozzle 20b and, as a result, the virtual raster line 42a is complemented by the first adjacent nozzle 20a. Of course, the printing control unit 12b may assign the virtual raster line 42a to the second adjacent nozzle 20b rather than the first adjacent nozzle 20a.

Note that the timing at which the data of the virtual raster line data is assigned to the first adjacent nozzle or the second adjacent nozzle need not be after generation of the print data in a format defining the dot-on and dot-off for each pixel. For example, the control unit 11 adds the gradation value of each pixel of the virtual raster line in the image data having gradation values for each CMYK for each pixel before halftone processing to the gradation value of each pixel of one of the two normal raster lines adjacent to the virtual raster line in the width direction D2, and then sets the gradation values of all pixels of the virtual raster line to zero. Then, halftone processing is performed on the image data after this addition process, thereby generating the print data. With such print data, for example, dot-on or dot-off is determined in a state of the normal raster line corresponding to the first adjacent nozzle including the ink amount of the first adjacent virtual raster line, and therefore the virtual raster line is substantially assigned to the first adjacent nozzle.

The exemplary embodiment described above is referred to as a first exemplary embodiment for convenience. In each of the following exemplary embodiments, descriptions common to those of the first exemplary embodiment will be omitted, as appropriate.

4. Second Exemplary Embodiment

A second exemplary embodiment is a modified example of the second example described in FIG. 3. In the printing head 18 of the second example, portions of the first nozzle row and the second nozzle row overlap, and thus there is a degree of freedom in the positions of the boundary portion, the first adjacent nozzle, and the second adjacent nozzle. Here, in the second exemplary embodiment, the boundary portion may be disposed so that a "defective nozzle" that ejects ink poorly in the first nozzle row or the second nozzle row is included in the unused nozzles.

A defective nozzle is a nozzle 20 that cannot eject at all or cannot eject normally due to nozzle clogging or the like. A defective nozzle may be referred to as an abnormal nozzle. Configurations and methods for detecting a defective nozzle are known and thus not described herein. In any case, the control unit 11 can recognize a defective nozzle in the printing head 18. When a defective nozzle is included as one of the unused nozzles of the boundary portion, it is possible to avoid the influence of the defective nozzle on the printing result.

Figure 7A:
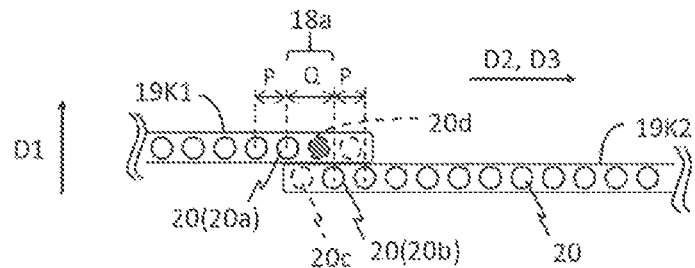
FIGS. 7A, 7B, 7C, and 7D are each a view exemplifying a position of a boundary portion in the printing head according to a second exemplary embodiment.
Figure 7B:
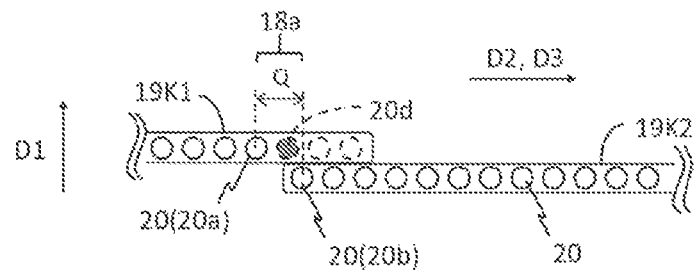
Figure 7C:
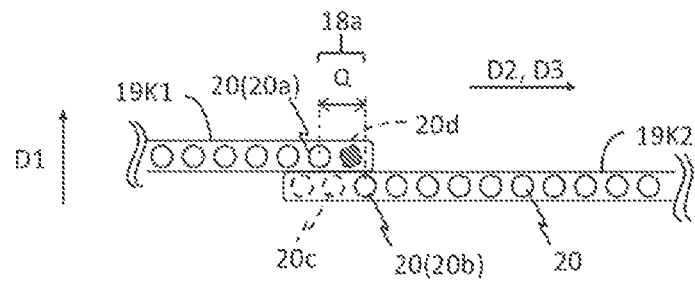
Figure 7D:
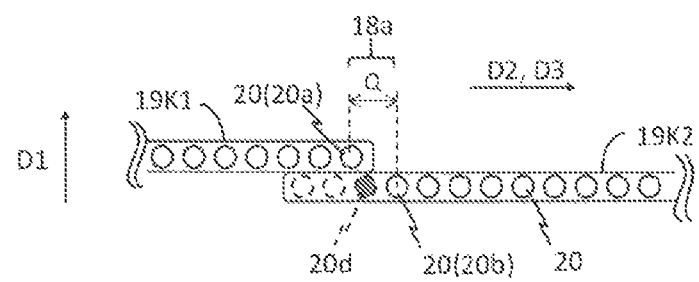

FIGS. 7A, 7B, 7C, and 7D each exemplify a position of the boundary portion 18a in the printing head 18 according to the second exemplary embodiment. FIGS. 7A, 7B, 7C, and 7D each focus on the boundary portions 18a of the nozzle row 19K1 and the nozzle row 19K2, and the way each drawing is viewed is the same as that of FIG. 3. The respective boundary portions 18a illustrated in FIGS. 7A, 7B, 7C, and 7D differ in position in the nozzle alignment direction D3. As in FIG. 3, an unused nozzle is indicated by a dashed circle, and defective nozzles 20d are further indicated in gray for easy recognition. The defective nozzle 20d is also an unused nozzle. Incidentally, the boundary portion 18a illustrated in FIG. 7A is the same as the boundary portion 18a of the nozzle rows 19K1, 19K2 illustrated in FIG. 3.

That is, the control unit 11 recognizes the position of the defective nozzle 20d in the nozzle row unit of the printing head 18, and sets the boundary portion 18a including the position of the defective nozzle 20d and the first adjacent nozzle 20a and the second adjacent nozzle 20b adjacent to this boundary portion 18a. The interval between the first adjacent nozzle 20a in the nozzle row 19K1 and the second adjacent nozzle 20b in the nozzle row 19K2 sandwiching the boundary portion 18a is the distance Q. Then, the control unit 11 need only generate a virtual raster line corresponding to the virtual nozzle assumed in the boundary portion 18a thus determined, and execute the complementing step described above.

Depending on the position of the defective nozzle in the nozzle row unit, it may not be possible to set a boundary portion that includes the position of the defective nozzle. Thus, in a situation in which it is possible to set a boundary portion that includes the position of the defective nozzle and the first adjacent nozzle and the second adjacent nozzle adjacent to this boundary portion, the second exemplary embodiment may be adopted, and otherwise, as in the example in FIG. 3, the boundary portion 18a and the first adjacent nozzle 20a and the second adjacent nozzle 20b adjacent to the boundary portion 18a may be set irrespective of the defective nozzle.

5 Third Exemplary Embodiment

As illustrated in FIG. 2 and FIG. 3, the printing head 18 is capable of ejecting ink of a plurality of colors, and includes the first nozzle row and the second nozzle row for each color of ink. In FIGS. 2 and 3, the position of the boundary portion 18a is common to the nozzle row units of CMYK. Nevertheless, the boundary portion may be disposed at positions shifted in the nozzle alignment direction D3 for each color of ink.

Figure 8:
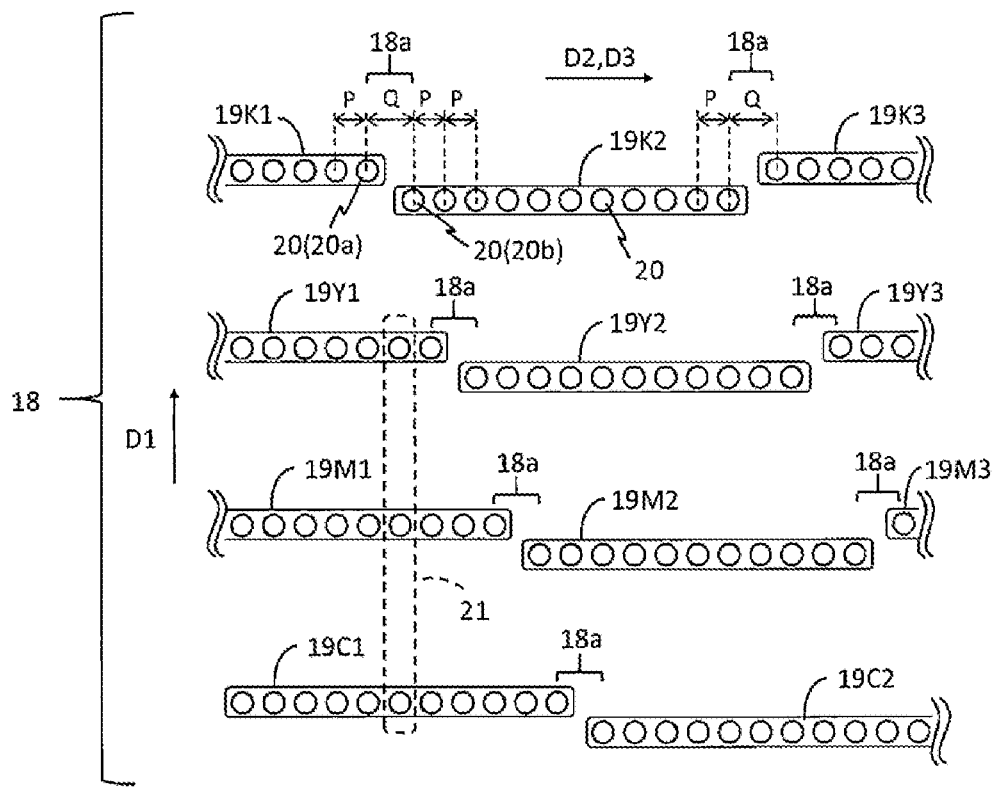
FIG. 8 is a view exemplifying the printing head according to a third exemplary embodiment.

FIG. 8 illustrates, in a simplified manner, the printing head 18 according to a third exemplary embodiment from the same perspective as in FIG. 2 and FIG. 3. The printing head 18 of FIG. 8 differs from the printing head 18 of FIG. 2 in that the position of the boundary portion 18a is shifted in the nozzle alignment direction D3 for each nozzle row unit of CMYK. According to such a configuration, it is possible to complement an image to be complemented of a certain ink color with another ink color. In FIG. 8, each of the 20 nozzles in each nozzle row unit of CMY having the same or substantially the same position in the nozzle alignment direction D3 as the boundary portion 18a of the nozzle rows 19K1, 19K2 is illustrated as a nozzle group 21 surrounded by dashed lines.

For example, the control unit 11 assigns at least a portion of the dots of the virtual raster line of the K ink generated in accordance with the virtual nozzle of the boundary portion 18a of the nozzle rows 19K1, 19K2 to each nozzle 20 of the nozzle group 21. This makes it possible to complement the virtual raster line not only by the first adjacent nozzle 20a or the second adjacent nozzle 20b already described, but also by the nozzle group 21. In particular, according to the nozzle group 21, it is possible to complement the virtual raster line of the K ink by a composite black expressed by color mixing the CMY ink. Further, according to such a third exemplary embodiment, the respective virtual raster lines of CMY can be complemented to a certain extent by ink of different colors.

Although not illustrated, the third exemplary embodiment is, of course, also applicable to a configuration in which the first nozzle row and the second nozzle row partially overlap for each color of ink illustrated in FIG. 3, FIG. 7A, and the like.

6. Fourth Exemplary Embodiment

The printing head 18 described above is a type of head that does not move. However, in a fourth exemplary embodiment, the printing head 18 is movable in a main scanning direction D4 that intersects the nozzle alignment direction D3. That is, the printing head 18 is mounted on a so-called carriage that reciprocates in the main scanning direction D4 by the power of a motor, and moves along with the carriage.

Figure 9:
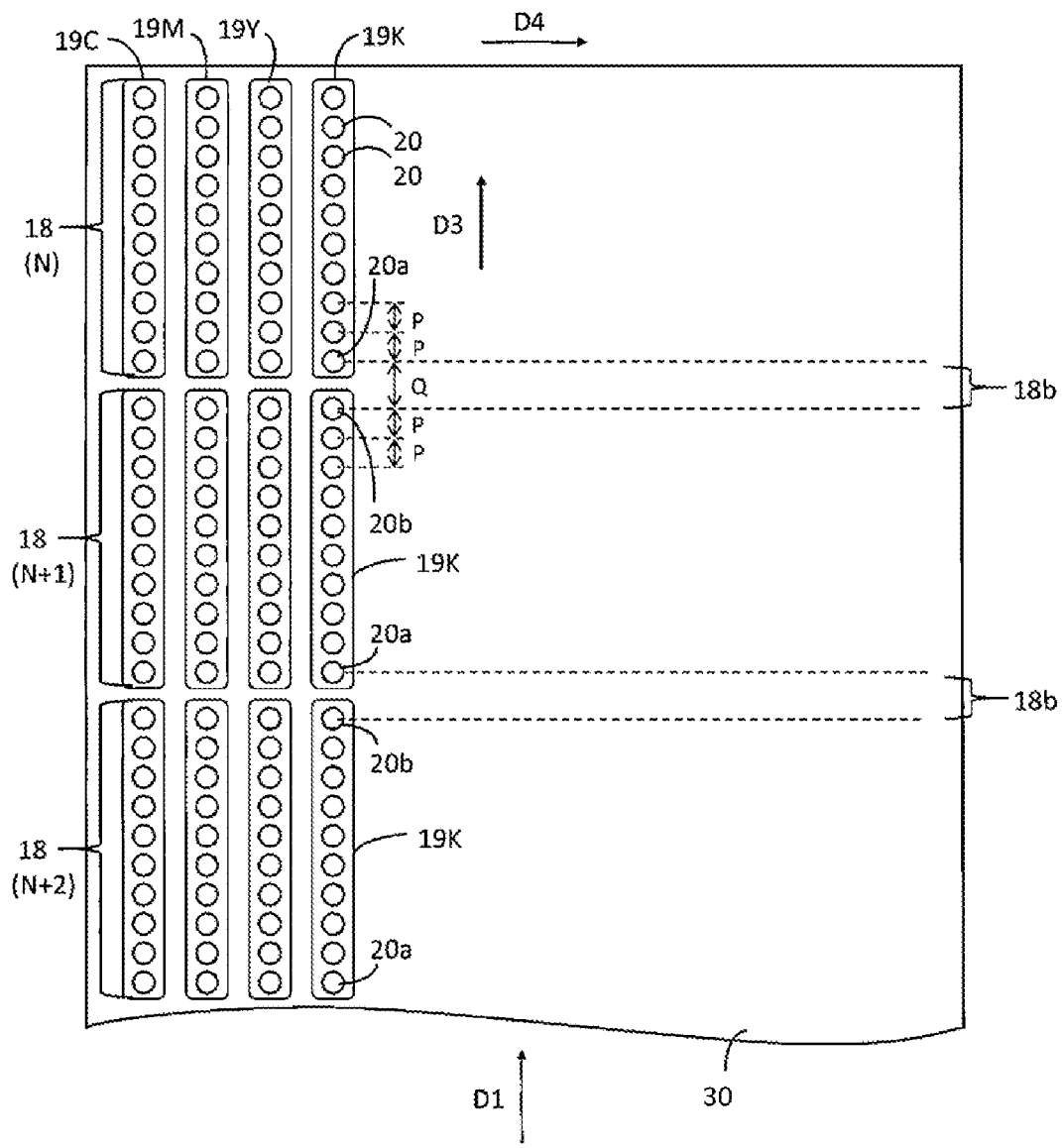
FIG. 9 is a view illustrating, in a simplified manner, a relationship between the medium and the printing head according to a fourth exemplary embodiment, as viewed from above.

FIG. 9 illustrates, in a simplified manner, a relationship between the medium 30 and the printing head 18 according to the fourth exemplary embodiment, as viewed from above. The main scanning direction D4 intersects the transport direction D1. The main scanning direction D4 may be interpreted as the same as the width direction D2 described in FIGS. 2, 3, 5, 6, and the like. In FIG. 9, the nozzle alignment direction D3 is parallel or substantially parallel with the transport direction D1. In FIG. 9 as well, each white circle is an individual nozzle 20.

In FIG. 9, the printing head 18 includes nozzle rows 19C, 19M, 19Y, 19K of each ink color. The nozzle row 19C is configured to include a plurality of the nozzles 20 for ejecting the C ink, side by side in the nozzle alignment direction D3. Similarly, the nozzle row 19M is configured to include a plurality of the nozzles 20 side by side for ejecting the ink M, the nozzle row 19Y is configured to include a plurality of the nozzles 20 side by side for ejecting the ink Y, and the nozzle row 19K is configured to include a plurality of the nozzles 20 side by side for ejecting the ink K. The respective nozzle rows 19C, 19M, 19Y, 19K of CMYK are aligned in the main scanning direction D4, and positions thereof in the transport direction D1 coincide.

The control unit 11 causes the printing head 18 to execute a "pass" of ejecting ink from each nozzle 20 onto the medium 30 on the basis of the print data associated with the movement of the printing head 18 by the carriage. In FIG. 9, the description of the carriage is omitted. Alternatively, the printing head 18 itself of FIG. 9 may be interpreted as serving as the carriage as well. The pass may be referred to as a "scan". That is, the control unit 11 prints the image represented by the print data on the medium 30 by alternately repeating a pass and the transport of the medium 30 by the transport unit 17. In this context, transport over a fixed distance is referred to as "paper feeding". In such a fourth exemplary embodiment, a pixel row that is a row in which pixels are aligned in the main scanning direction D4 that intersects the nozzle alignment direction D3 is a raster line.

In FIG. 9, "N" or "N+1" in parentheses in the vicinity of the reference sign "18" indicates the number of the pass of the printing head 18 with respect to the medium 30. N is an integer equal to or greater than 1. That is, in FIG. 9, one printing head 18 indicates a positional relationship with the medium 30 when the first printing head 18 executes each of an N-th pass, an N+1-th pass, and an N+2-th pass. In FIG. 9, the printing head 18 appears to move upstream every time the number of passes increases by one, but, in reality, the transfer unit 17 feeds paper between the passes, thereby changing the positional relationship between the medium 30 and the printing head 18 in the transport direction D1.

In the fourth exemplary embodiment, the pass executed first between paper feeds is referred to as a "first pass" and the pass subsequently executed is referred to as a "second pass". According to FIG. 9, when the N-th pass is regarded as the first pass, for example, the N+1-th pass corresponds to the second pass. Similarly, when the N+1-th pass is regarded as the first pass, the N+2-th pass corresponds to the second pass. In the fourth exemplary embodiment, a "boundary portion 18b" is maintained between a position of the nozzle row 18 during execution of the first pass on the medium 30 and a position of the nozzle row 18 during execution of the second pass. That is, in FIGS. 2, 3, 8, 7A, and the like described above, the boundary portion 18a is present as a portion of the printing head 18, but in the fourth exemplary embodiment, the boundary portion 18b is considered to occur on the medium 30 in association with a relative positional change between the printing head 18 and the medium 30 in the transport direction D1. Specifically, the boundary portion 18b is maintained by making a distance of a single paper feed by the transport unit 17 longer than a length of the nozzle row in the transport direction D1 by the distance Q. Here, the length of the nozzle row in the transport direction D1 is considered the distance between the nozzle 20 furthest downstream and the nozzle 20 furthest upstream in the nozzle row.

For example, with focus placed on the nozzle row 19K of the printing head 18, the nozzle 20 furthest upstream is referred to as the first adjacent nozzle 20a and the nozzle 20 furthest downstream is referred to as the second adjacent nozzle 20b. According to FIG. 9, the boundary portion 18b is maintained between the first adjacent nozzle 20a of the nozzle row 19K during execution of the first pass and the second adjacent nozzle 20b of the nozzle row 19K during execution of the second pass. The concept of the first adjacent nozzle and the second adjacent nozzle adjacent to the boundary portion 18b is the same for the other nozzle rows 19C, 19M, 19Y.

Similar to the first to third exemplary embodiments, in step S110, the control unit 11 assumes a virtual nozzle in the boundary portion 18b, and generates a virtual raster line as a partial region of the image to be printed on the medium 30 in accordance with the virtual nozzle. Then, in steps S120, S130, the virtual raster line, which is the print data for printing the image to be complemented, is assigned to the first adjacent nozzle 20a adjacent to the boundary portion 18b during execution of the first pass, or to the second adjacent nozzle 20b adjacent to the boundary portion 18b during execution of the second pass. The image to be complemented is complemented by ink ejection from the first adjacent nozzle 20a or the second adjacent nozzle 20b on the basis of the virtual raster line assigned. That is, printing in the boundary portion 18b is complemented by ink ejection from the first adjacent nozzle 20a in the first pass or ink ejection from the second adjacent nozzle 20b in the second pass.

In FIG. 9, the position of the nozzle row during execution of the first pass and the position of the nozzle row during execution of the second pass in the vicinity of the boundary portion 18b do not overlap in the transport direction D1, and thus FIG. 9 can be regarded as a first example of the fourth exemplary embodiment. Naturally, in the fourth exemplary embodiment as well, a second example may be adopted in which the boundary portion 18b is maintained by the unused nozzles while partially overlapping the position of the nozzle row during execution of the first pass on the medium 30 and the position of the nozzle row during execution of the second pass. Further, in the fourth exemplary embodiment as well, the position of the boundary portion 18b in the transport direction D1 may differ for each nozzle row of CMYK.

7. Summary

Thus, according to this exemplary embodiment, the printing apparatus 10 includes the printing head 18 including the first nozzle in which a plurality of the nozzles 20 are provided side by side in the nozzle alignment direction D3 and the second nozzle row arranged shifted from the first nozzle row in the nozzle alignment direction D3 and in which a plurality of the nozzles 20 are provided side by side in the nozzle alignment direction D3, and the control unit 11 configured to control ejection of ink from the plurality of nozzles 20 included in the printing head 18 onto the medium 30 based on print data. Then, the control unit 11 is configured to set an image to be complemented as a partial region of an image to be printed on the medium 30 in accordance with the boundary portion 18a between the first nozzle row and the second nozzle row, assign print data for printing the image to be complemented to the first adjacent nozzle 20a serving as the nozzle 20 in the first nozzle row and adjacent to the boundary portion 18a or the second adjacent nozzle 20b serving as the nozzle 20 in the second nozzle row and adjacent to the boundary portion 18a, and complement the image to be complemented by ink ejection from the first adjacent nozzle 20a or the second adjacent nozzle 20b based on the print data assigned.

According to the configuration described above, the image to be complemented set in accordance with the boundary portion 18a between the first nozzle row and the second nozzle row is complemented by ink ejection from the first adjacent nozzle 20a or the second adjacent nozzle 20b adjacent to the boundary portion 18a. Therefore, it is possible to eliminate density differences and density irregularities in the printing result caused by using the overlapping portion and the non-overlapping portion of the nozzle rows in the related art for printing. Further, in a configuration in which an overlapping portion and a non-overlapping portion of the nozzle rows co-exist, density differences in the printing result readily vary for each printing apparatus 10 manufactured. However, according to this exemplary embodiment, such variation in each product can also be eliminated.

Further, according to this exemplary embodiment, when an interval between the nozzles 20 of the first nozzle row or an interval between the nozzles 20 of the second nozzle row in the nozzle alignment direction D3 is defined as the nozzle pitch P, the boundary portion 18a may be disposed between the first adjacent nozzle 20a and the second adjacent nozzle 20b by the first adjacent nozzle 20a serving as the nozzle 20 at the end of the first nozzle row on the second nozzle row side, and the second adjacent nozzle 20b serving as the nozzle 20 at the end of the second nozzle row on the first second nozzle row side being spaced apart by a distance longer than the nozzle pitch P.

According to the configuration described above, the first nozzle row and the second nozzle row are actually spaced apart by a distance longer than the nozzle pitch P. Accordingly, it is possible to reliably eliminate density differences and density irregularities of the printing result caused by the overlapping portion and the non-overlapping portion of the nozzle rows in the related art. Further, for printing on the medium 30, printing can be performed by utilizing the length of each nozzle row to the maximum extent, making it possible to perform printing using a lesser number of nozzle rows for a larger medium width.

Further, according to this exemplary embodiment, an end portion of the first nozzle row on the second nozzle row side and an end portion of the second nozzle row on the first nozzle row side may overlap in the nozzle alignment direction D3, when an interval between the nozzles 20 of the first nozzle row or an interval between the nozzles 20 of the second nozzle row in the nozzle alignment direction D3 is defined as the nozzle pitch P, the first adjacent nozzle 20a and the second adjacent nozzle 20b may be spaced apart by a distance longer than the nozzle pitch P, and the boundary portion 18a may be disposed between the first adjacent nozzle 20a and the second adjacent nozzle 20b by setting the nozzle 20 of the first nozzle row and the nozzle 20 of the second nozzle row that exist between the first adjacent nozzle 20a and the second adjacent nozzle 20b as unused nozzles not used for ink ejection.

According to the configuration described above, the first nozzle row and the second nozzle row partially overlap, but the first adjacent nozzle 20a and the second adjacent nozzle 20b are spaced apart by a distance longer than the nozzle pitch P, and the nozzles disposed between the first adjacent nozzle 20a and the second adjacent nozzle 20b are the unused nozzles 20c. Accordingly, from the perspective of printing, the first nozzle row and the second nozzle row do not substantially overlap, making it possible to reliably eliminate density differences and density irregularities of the printing result caused by the overlapping portion and the non-overlapping portion of the nozzle rows in the related art.

Further, according to this exemplary embodiment, the boundary portion 18a may be disposed so that a defective nozzle having an ink ejection defect in the first nozzle row or the second nozzle row is included in the unused nozzles.

According to the configuration described above, by including the defective nozzle in the unused nozzles of the boundary portion 18a, it is possible to avoid a reduction in print quality that occurs when a defective nozzle is used for printing.

Further, according to this exemplary embodiment, the printing head is configured to eject ink of a plurality of colors, and includes the first nozzle row and the second nozzle row for each color of ink. Then, the boundary portion 18a may be disposed in a position shifted in the nozzle alignment direction D3 for each color of ink.

According to the configuration described above, an image to be complemented of a certain color can be complemented using ink of another color.

Further, according to this exemplary embodiment, the printing apparatus 10 includes the printing head 18 including a nozzle row in which the nozzles 20 are provided side by side in the nozzle alignment direction D3, and configured to move in the main scanning direction D4 intersecting the nozzle alignment direction D3, and the control unit 11 configured to execute a pass of ejecting ink from the nozzle 20 onto the medium 30 based on print data in association with the movement. Then, the control unit 11 is configured to set an image to be complemented as a partial region of an image to be printed on the medium 30 in accordance with the boundary portion 18b between the position of the nozzle row during execution of the first pass on the medium 30 and the position of the nozzle row during execution of the second pass following the first pass, assign print data for printing the image to be complemented to the first adjacent nozzle 20a serving as the nozzle 20 of the nozzle row during execution of the first pass and adjacent to the boundary portion 18b or the second adjacent nozzle 20b serving as the nozzle 20 of the nozzle row during execution of the second pass and adjacent to the boundary portion 18b, and complement the image to be complemented by ink ejection from the first adjacent nozzle 20a or the second adjacent nozzle 20b based on the print data assigned.

According to the configuration described above, the image to be complemented set in accordance with the boundary portion 18b is complemented by ink ejection from the first adjacent nozzle 20a or the second adjacent nozzle 20b adjacent to the boundary portion 18b. Therefore, it is possible to eliminate density differences and density irregularities of the printing result caused by the coexistence of an overlapping portion and a non-overlapping portion, which does not correspond to an overlapping portion, of the printing by the nozzle row of the first pass and the printing by the nozzle row of the second pass in the related art on the medium. Further, in a configuration in which an overlapping portion and a non-overlapping portion co-exist in the printing result, density differences readily vary for each printing apparatus 10 manufactured. However, according to this exemplary embodiment, such variation in each product can also be eliminated.

This exemplary embodiment is not limited to a device or a system, but discloses various categories of inventions, such as a method executed by a device or a system, and the program 12 that causes a processor to execute the method.

For example, a printing method of controlling, based on print data, the printing head 18 including the first nozzle row in which the plurality of nozzles 20 are provided side by side in the nozzle alignment direction D3, and the second nozzle row arranged shifted from the first nozzle row in the nozzle alignment direction D3 and provided with the plurality of nozzles 20 side by side in the nozzle alignment direction D3 to eject ink from the nozzle 20 onto the medium 30, includes the setting step for setting an image to be complemented as a partial region of an image to be printed on the medium 30 in accordance with the boundary portion 18a between the first nozzle row and the second nozzle row, the assigning step for assigning print data for printing the image to be complemented to the first adjacent nozzle 20a serving as the nozzle 20 in the first nozzle row and adjacent to the boundary portion 18a or the second adjacent nozzle 20b serving as the nozzle 20 in the second nozzle row and adjacent to the boundary portion 18a, and a complementing step for complementing the image to be complemented by ink ejection from the first adjacent nozzle 20a or the second adjacent nozzle 20b based on the print data assigned.

Further, a printing method of performing printing by executing a pass of ejecting ink from the nozzle 20 onto the medium 30 based on print data while moving the printing head 18 including the nozzle row in which the plurality of nozzles 20 are provided side by side in the nozzle alignment direction D3, in the main scanning direction D4 intersecting the nozzle alignment direction D3, includes the setting step for setting an image to be complemented as a partial region of an image to be printed on the medium 30 in accordance with the boundary portion 18b between the position of the nozzle row during execution of the first pass on the medium 30 and the position of the nozzle row during execution of the second pass following the first pass, the assigning step for assigning print data for printing the image to be complemented to the first adjacent nozzle 20a serving as the nozzle 20 of the nozzle row during execution of the first pass and adjacent to the boundary portion 18b or the second adjacent nozzle 20b serving as the nozzle 20 of the nozzle row during execution of the second pass and adjacent to the boundary portion 18b, and the complementing step for complementing the image to be complemented by ink ejection from the first adjacent nozzle 20a or the second adjacent nozzle 20b based on the print data assigned.

As described above, the print data for printing the image to be complemented is assigned to one of the first adjacent nozzle 20a and the second adjacent nozzle 20b, making it possible to print the image to be complemented by either the first adjacent nozzle 20a or the second adjacent nozzle 20b. Therefore, a raster line printed by one nozzle 20 and a raster line printed by two nozzles 20 do not coexist in the printing result of the overall image, making it possible to effectively suppress density irregularities.

However, the print data for printing the image to be complemented can also be divided and assigned at a predetermined ratio to the first adjacent nozzle 20a and the second adjacent nozzle 20b. The predetermined ratio referred to here is preferably a biased ratio, such as, for example, 10%:90% or 80%:20%, as compared to a ratio of equal portions, that is, 50%:50%.

When such a configuration is included, it can be said that the control unit 11 is configured to assign print data for printing the image to be complemented to at least one of the first adjacent nozzle 20a serving as the nozzle 20 in the first row and adjacent to the boundary portion 18a and the second adjacent nozzle 20b serving as the nozzle 20 in the second nozzle row and adjacent to the boundary portion 18a, and complement the image to be complemented by ink ejection from at least one of the first adjacent nozzle 20a and the second adjacent nozzle 20b based on the print data assigned.

Further, it can be said that the control unit 11 is configured to assign print data for printing the image to be complemented to at least one of the first adjacent nozzle 20a serving as the nozzle 20 of the nozzle row during execution of the first pass and adjacent to the boundary portion 18b and the second adjacent nozzle 20b serving as the nozzle 20 of the nozzle row during execution of the second pass and adjacent to the boundary portion 18b, and complement the image to be complemented by ink ejection from at least one of the first adjacent nozzle 20a and the second adjacent nozzle 20b based on the print data assigned.

Further, from the viewpoint that the printing corresponding to the boundary portion is complemented by the nozzles 20 in the vicinity, the nozzles 20 to which the image to be complemented is to be assigned may include not only the first adjacent nozzle, but also the nozzle 20 adjacent to the first adjacent nozzle on the opposite side of the boundary portion, and similarly may include not only the second adjacent nozzle, but also the nozzle 20 adjacent to the second adjacent nozzle on the opposite side to the boundary portion.

What is claimed is:

1. A printing apparatus comprising:
a printing head including
a first nozzle row, in which a plurality of nozzles are provided side by side in a nozzle alignment direction, and
a second nozzle row arranged shifted from the first nozzle row in the nozzle alignment direction and in which a plurality of nozzles are provided side by side in the nozzle alignment direction; and
a control unit configured to control ejection of ink from the plurality of nozzles included in the printing head onto a medium based on print data, wherein
the control unit is configured to
assume a virtual nozzle of a boundary portion between the first nozzle row and the second nozzle row, other than ink-ejectable nozzles among the plurality of nozzles of each of the first and second nozzle rows to print an image on the medium, and set an image to be complemented, which is an image of a virtual raster line, as a partial region of the image to be printed on the medium, the virtual raster line corresponding to the virtual nozzle and being a row of pixels side by side in a direction perpendicular to the nozzle alignment direction, assign print data for printing the image to be complemented to at least one of a first adjacent nozzle that is a nozzle in the first nozzle row and adjacent to the boundary portion and a second adjacent nozzle that is a nozzle in the second nozzle row and adjacent to the boundary portion, and complement the image to be complemented by ink ejection from at least one of the first adjacent nozzle and the second adjacent nozzle based on the print data assigned.

2. The printing apparatus according to claim 1, wherein when an interval between the plurality of nozzles of the first nozzle row or an interval between the plurality of nozzles of the second nozzle row in the nozzle alignment direction is defined as a nozzle pitch, the boundary portion is disposed between the first adjacent nozzle and the second adjacent nozzle by the first adjacent nozzle that is a nozzle at an end of the first nozzle row on the second nozzle row side, and the second adjacent nozzle that is a nozzle at an end of the second nozzle row on the first second nozzle row side being spaced apart by a distance longer than the nozzle pitch.

3. The printing apparatus according to claim 1, wherein an end portion of the first nozzle row on the second nozzle row side and an end portion of the second nozzle row on the first nozzle row side overlap in the nozzle alignment direction, when an interval between the plurality of nozzles of the first nozzle row or an interval between the plurality of nozzles of the second nozzle row in the nozzle alignment direction is defined as a nozzle pitch, the first adjacent nozzle and the second adjacent nozzle are spaced apart by a distance longer than the nozzle pitch, and the boundary portion is disposed between the first adjacent nozzle and the second adjacent nozzle by setting a nozzle of the first nozzle row and a nozzle of the second nozzle row that exist between the first adjacent nozzle and the second adjacent nozzle as unused nozzles not used for ink ejection.

4. The printing apparatus according to claim 3, wherein the boundary portion is disposed so that a defective nozzle having an ink ejection defect in the first nozzle row or the second nozzle row is included in the unused nozzles.

5. The printing apparatus according to claim 1, wherein the printing head is configured to eject ink of a plurality of colors, and includes the first nozzle row and the second nozzle row for each color of ink, and the boundary portion is disposed in a position shifted in the nozzle alignment direction for each color of ink.

6. A printing method of controlling, based on print data, a printing head to eject ink from a nozzle onto a medium, the printing head including a first nozzle row, in which a plurality of nozzles are provided side by side in a nozzle alignment direction, and a second nozzle row which is arranged shifted from the first nozzle row in the nozzle alignment direction and in which a plurality of nozzles are provided side by side in the nozzle alignment direction, the printing method comprising:

assuming a virtual nozzle of a boundary portion between the first nozzle row and the second nozzle row, other than ink-ejectable nozzles among the plurality of nozzles of each of the first and second nozzle rows to print an image on the medium, setting an image to be complemented, which is an image of a virtual raster line, as a partial region of the image to be printed on the medium, the virtual raster line corresponding to the virtual nozzle and being a row of pixels side by side in a direction perpendicular to the nozzle alignment direction;

assigning print data for printing the image to be complemented to at least one of a first adjacent nozzle that is a nozzle in the first nozzle row and adjacent to the boundary portion and a second adjacent nozzle that is a nozzle in the second nozzle row and adjacent to the boundary portion; and complementing the image to be complemented by ink ejection from at least one of the first adjacent nozzle and the second adjacent nozzle based on the print data assigned.

* * * * *